United States Patent
Mao

(10) Patent No.: US 12,225,249 B2
(45) Date of Patent: Feb. 11, 2025

(54) TRANSMISSION OF GROUPS OF CODED PICTURE FRAMES

(71) Applicant: Tencent Technology (Shenzhen) Company Limited, Guangdong (CN)

(72) Inventor: Junling Mao, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 18/140,490

(22) Filed: Apr. 27, 2023

(65) Prior Publication Data
US 2023/0262273 A1    Aug. 17, 2023

Related U.S. Application Data

(63) Continuation of application No. PCT/CN2022/097539, filed on Jun. 8, 2022.

(30) Foreign Application Priority Data

Jul. 15, 2021    (CN) .......................... 202110802637.2

(51) Int. Cl.
*H04N 7/16*    (2011.01)
*H04N 21/2343*    (2011.01)

(52) U.S. Cl.
CPC .............................. *H04N 21/2343* (2013.01)

(58) Field of Classification Search
CPC ........... H04N 21/2343; H04N 21/6131; H04N 21/6181; H04N 21/64738; H04N 21/23655; H04N 19/70
See application file for complete search history.

(56) References Cited

U.S. PATENT DOCUMENTS

2015/0312651 A1* 10/2015 Zhuang ................ H04N 19/164
                                                         348/143
2017/0180764 A1*  6/2017 Koupas .............. H04N 21/4333

FOREIGN PATENT DOCUMENTS

| CN | 111741276 A | * | 10/2020 | ......... H04N 21/8547 |
| CN | 113068001 A | * | 7/2021 | ....... H04N 21/64792 |
| CN | 113259717 A |   | 8/2021 | |

OTHER PUBLICATIONS

English translation version of CN 111741276 A (Year: 2020).*
English translation version of CN 113068001 A (Year: 2021).*
International Search Report in PCT/CN2022/097539, mailed Aug. 18, 2022, 5 pages.
Written Opinion in PCT/CN2022/097539, mailed Aug. 18, 2022, 5 pages.

* cited by examiner

*Primary Examiner* — Gigi L Dubasky
(74) *Attorney, Agent, or Firm* — ArentFox Schiff LLP

(57) ABSTRACT

A video stream processing method is provided. A first group of coded picture frames in a video stream is received. A storage time and a network request protection time corresponding to the first group are determined. The storage time is an amount of time an intra frame of the first group is stored for transmission to a network node. When a transmission conflict with at least one second terminal occurs in a process of transmitting the intra frame to the network node, a start time of at least a second group of coded picture frames in the video stream is determined according to the storage time and the network request protection time, the second group being after the first group. An intra frame of the second group is transmitted to the network node based on the start time of the second group.

20 Claims, 6 Drawing Sheets

TRANSMISSION OF GROUPS OF CODED PICTURE FRAMES

RELATED APPLICATIONS

This application is a continuation of International Application No. PCT/CN2022/097539, entitled "VIDEO STREAM PROCESSING METHOD AND APPARATUS, DEVICE, STORAGE MEDIUM, AND PROGRAM PRODUCT" and filed on Jun. 8, 2022, which claims priority to Chinese Patent Application No. 202110802637.2, entitled "VIDEO STREAM PROCESSING METHOD, APPARATUS, DEVICE, STORAGE MEDIUM, AND PROGRAM PRODUCT" and filed on Jul. 15, 2021. The entire disclosures of the prior applications are hereby incorporated by reference in their entirety.

FIELD OF THE TECHNOLOGY

This application relates to the field of computer technologies, including to a video stream processing method, apparatus, device, computer-readable storage medium, and computer program product.

BACKGROUND OF THE DISCLOSURE

Group of Pictures (GoP) in a video stream is a group of consecutive pictures in the video stream. The GoP includes a group of frames in video coding, such as a group of coded picture frames. In a GoP, the first frame after coding can be an I frame.

In the related art, audio and video real-time communication is performed in a public network scenario. After a video stream is started, the video stream is coded in cycles based on a set GoP duration. In other words, I frame coding is performed on the first frame of each GoP cycle, to obtain an I frame. During real-time audio and video communication by a plurality of terminals in a network, in a case that a conflict occurs between the plurality of terminals during uplink transmission of an I frame, transmission of the I frame takes more time due to limited transmission resources of the network, which increases the latency in transmission of a video stream.

SUMMARY

Embodiments of this disclosure include a video stream processing method, apparatus, device, computer-readable storage medium, and computer program product, which can reduce the latency in transmission of a video stream.

An embodiment of this disclosure provides a video stream processing method. The method is performed by a first terminal for example. In the method, a first group of coded picture frames in a video stream is received. A storage time and a network request protection time corresponding to the first group of coded picture frames are determined. The storage time is an amount of time an intra frame of the first group of coded picture frames is stored for transmission to a network node. When a transmission conflict with at least one second terminal occurs in a process of transmitting the intra frame to the network node, a start time of at least a second group of coded picture frames in the video stream is determined according to the storage time and the network request protection time, the second group of coded picture frames being after the first group of coded picture frames. An intra frame of the second group of coded picture frames is transmitted to the network node based on the start time of the second group of coded picture frames.

An embodiment of this disclosure further provides a video stream processing apparatus, the apparatus including processing circuitry configured to receive a first group of coded picture frames in a video stream. The processing circuitry is configured to determine a storage time and a network request protection time corresponding to the first group of coded picture frames, the storage time being an amount of time an intra frame of the first group of coded picture frames is stored for transmission to a network node. The processing circuitry is configured to, when a transmission conflict with at least one second terminal occurs in a process of transmitting the intra frame to the network node, determine a start time of at least a second group of coded picture frames in the video stream according to the storage time and the network request protection time, the second group of coded picture frames being after the first group of coded picture frames. The processing circuitry is configured to transmit an intra frame of the second group of coded picture frames to the network node based on the start time of the second group of coded picture frames.

An embodiment of this disclosure further provides electronic equipment, including: a processor, a memory, and a bus. The bus is configured to connect the processor and the memory. The memory is configured to store operation instructions. The processor is configured to execute any of the video stream processing methods by invoking the operation instructions.

An embodiment of this disclosure further provides a non-transitory computer-readable storage medium, storing instructions which when executed by a processor cause the processor to perform any of the video stream processing methods.

An embodiment of this disclosure further provides a computer program product, including a computer program or instructions, and the computer program or the instructions, when executed by a processor, implementing any of the video stream processing methods.

The technical solutions provided in the embodiments of this disclosure may include at least the following beneficial effects:

In a case that a first terminal conflicts with at least one second terminal during uplink transmission of an I frame of a first group of coded picture frames, a start moment of at least one second group of coded picture frames after the first group of coded picture frames in a video stream is determined according to a first time and a second time, and an I frame of the second group of coded picture frames is transmitted to a network node based on the determined start moment of the second group of coded picture frames; in this way, because the first time is a period of time from storing of the I frame of the first group of coded picture frames to transmitting of the I frame to the network node and the second time is a network request protection time, even if the first terminal is postponed in transmitting the I frame of the first group of coded picture frames, the start moment of the at least one second group of coded picture frames after the first group of coded picture frames can dynamically change with a change in the first time due to the fact that the second group of coded picture frames is determined according to the first time and the second time, so as to prevent the first terminal from conflicting with the second terminal in a process of transmitting the I frame of the second group of coded picture frames to the network node, thereby reducing the latency in transmission of the video stream and alleviating the latency jitter.

DESCRIPTION OF EMBODIMENTS

Figure 1:
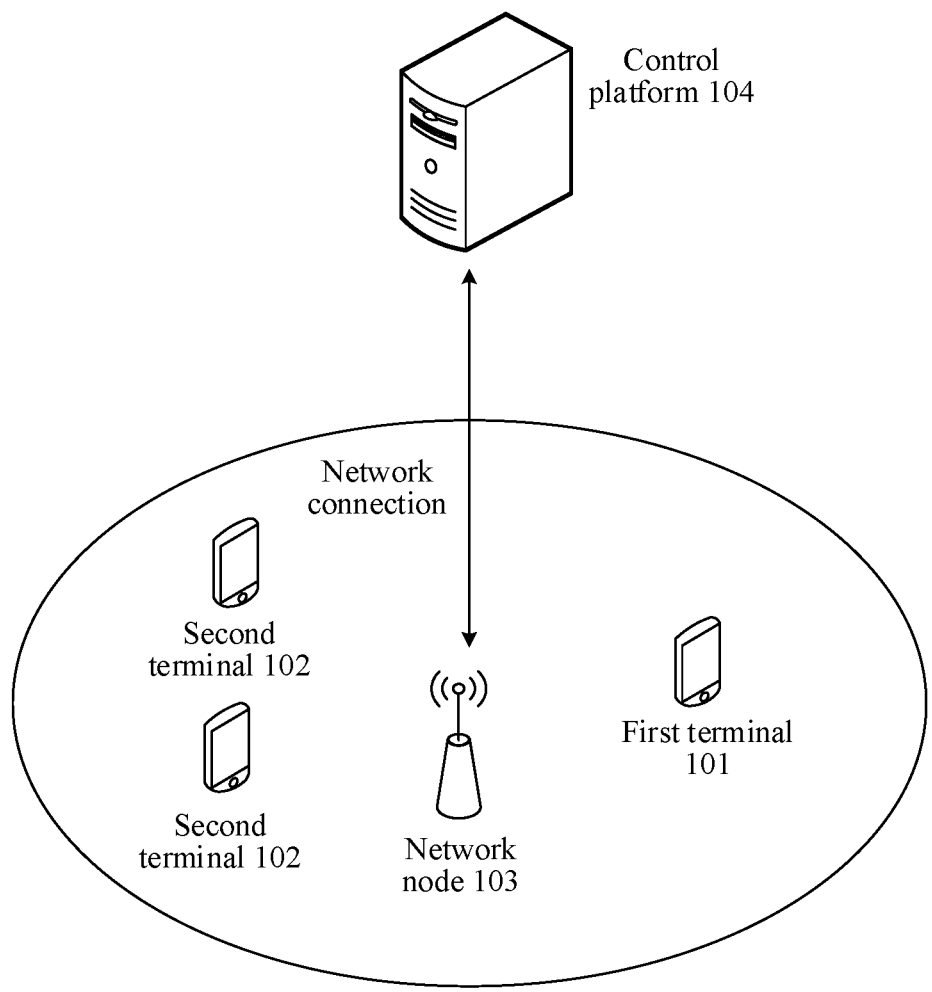
FIG. 1 is a schematic diagram of a system architecture according to an embodiment of this disclosure.

Embodiments of this disclosure are described in further detail with reference to the accompanying drawings. The described embodiments are merely some rather than all of the embodiments of this disclosure. Other embodiments shall fall within the scope of this disclosure.

Examples of the embodiments are illustrated in the accompanying drawings, where the same or similar reference numerals represent the same or similar elements or elements having the same or similar functions. The embodiments described below with reference to the accompanying drawings are exemplary and are only used to explain this disclosure, and cannot be construed as limiting this disclosure.

It may be understood by those skilled in the art that the singular forms "a", "an", "the", and "said" as used herein may also include plural forms unless expressly stated otherwise. The wording "include" used in the disclosure refers to the presence of features, integers, steps, operations, elements, and/or components, but does not preclude the presence or addition of one or more other features, integers, steps, operations, elements, components, and/or a combination thereof. In a case that an element is described as being "connected" or "coupled" to another element, the element can be directly connected or coupled to the other element, or there may also be an intermediate element. In addition, "connected" or "coupled" as used herein may include a wireless connection or a wireless coupling. The wording "and/or" as used herein includes all or any unit and all combinations of one or more associated listed items.

The embodiments of this disclosure include a video stream processing method for audio and video processing, such as a video stream processing method for audio and video processing in the field of cloud technologies. The video stream processing method may relate to various fields of the cloud technologies, for example, cloud computing, cloud service, and the like in the cloud technologies.

To better understand and describe the solutions of the embodiments of this disclosure, some technical terms involved in the embodiments of this disclosure are briefly described below.

(1) I Frame and GoP in Real-Time Video Coding

An I frame may refer to an intra-frame coded frame (intra picture), which is formed by coding according to picture content of a current frame in a video and is usually much larger in size than a frame using inter-frame coding. An I frame may be the first frame of each GoP, moderately compressed, used as a reference point for random access, and used as a picture. The I frame can be regarded as a product of a compressed picture.

In real-time video coding, to reduce the latency in coding and decoding, a GoP may be constructed by an I frame+an inter-frame coded frame of forward reference. In a case that an H.264 coder is used, in a real-time video coding scenario, the first frame may be set as an I frame and all subsequent frames may be set as P frames in a GoP. A P frame may be a forward predictive coded frame (predictive-frame), and a coded picture obtained by compressing transmission data volume by reducing temporal redundant information of previous coded frames in a picture sequence, and a P frame may also be referred to as a predictive frame.

A P frame adopts inter-coding, and decoding thereof depends on a previous frame (an I frame).

Due to a large size of an I frame, the latency and latency jitter in transmission thereof can be relatively large, which becomes one of significant factors affecting the latency of real-time video communication.

(2) Uplink Resource Scheduling of a $5^{th}$ Generation Mobile Communication Technology (5G) Network In a 5G network, uplink and downlink wireless transmission resources can be configured using different frames, and only uplink data may be allowed to be transmitted on uplink frames, for example, a terminal transmits uplink data to a base station; and only downlink data may be allowed to be transmitted on downlink frames, for example, a base station transmits downlink data to a terminal.

Frames of a common 5G network may be configured as 3D1U, where D represents a downlink frame, and U represents an uplink frame. For example, in a case that a time cycle is 5 ms, there are three downlink frames D, one uplink frame U, and one special subframe S, and a time length of each frame is 1 ms; uplink data of a plurality of terminals are scheduled by a base station to frames that can perform uplink transmission for transmitting; in a case that an amount of data transmitted uplink by the plurality of terminals simultaneously is large and uplink frames in a current 5 ms cycle cannot meet the requirements, some terminals among the plurality of terminals may be scheduled to uplink frames of a subsequent 5 ms cycle for transmitting; an amount of uplink data that can be transmitted in one U frame is correlated with configurations of the base station, configurations of the terminals, a signal strength, and the like, and the amount of the uplink data that can be transmitted in one U frame is usually about 125 KB; an amount of an I frame of a 1080P video stream is about 80 KB, and a coding parameter can be set according to an actual situation; and in a case that a plurality of terminals in a network transmit video streams simultaneously, and a collision (conflict) is formed during simultaneous uplink transmission of I frames by the plurality of terminals, some terminals among the plurality of terminals need to be postponed to a U frame of a subsequent 5 ms cycle for transmitting, and therefore an additional network latency is generated.

The solutions provided in the embodiments of this disclosure may relate to the cloud technologies, the embodiments provided in this disclosure may be combined with each other, and the same or similar concept or process may not be described in detail in some embodiments. The following describes the embodiments of this disclosure with reference to the accompanying drawings.

The solutions provided in the embodiments of this disclosure may be applied to any application scenario in the field of cloud technologies that require audio and video processing. According to the solution, a first terminal receives a first group of coded picture frames in a video stream; a first terminal determines a first time and a second time corresponding to the first group of coded picture frames; in a case that the first terminal conflicts with at least one second terminal in a process of transmitting an I frame to a network node, the first terminal determines the start moment of at least one second group of coded picture frames in the video stream according to the first time and the second time, stores an I frame of the second group of coded picture frames to the first terminal based on the start moment of the second group of coded picture frames, and then transmits the stored I frame of the second group of coded picture frames to the network node, so that the first terminal can be prevented from conflicting with the at least one second terminal during uplink transmission of the I frame of the second group of coded picture frames, thereby reducing the latency in transmission of the video stream and alleviating the latency jitter.

To better understand the solutions provided in the embodiments of this disclosure, the following describes the solution in combination with an application scenario.

In an embodiment, FIG. 1 illustrates a schematic structural diagram of a video stream processing system applicable to the embodiments of this disclosure. The video stream processing method provided in this embodiment of this disclosure can be applicable to, but is not limited to be applied to, an application scenario shown in FIG. 1.

In this example, as shown in FIG. 1, a video stream processing system in this example may include, but is not limited to, a first terminal 101, a plurality of second terminals 102, a network node 103, and a control platform 104. The network node 103 may communicate with the control platform 104 over a network. Video stream transmission is performed between a plurality of terminals and the network node 103, and the plurality of terminals include the first terminal 101 and the plurality of second terminals 102. The first terminal 101 and the plurality of second terminals 102 obtain video streams through respective video stream acquisition devices. The video stream acquisition devices may be cameras. The first terminal 101 and the plurality of second terminals 102 respectively store I frames of groups of coded picture frames in the respective obtained video streams to their respective caches. The caches may be network caches of modules/chips in the terminals. In a case that a collision (conflict) occurs between the first terminal 101 and the at least one second terminal 102 during uplink transmission of an I frame of a group of coded picture frames, the first terminal 101 determines a start moment of a subsequent group of coded picture frames, and transmits an I frame of the subsequent group of coded picture frames to the network node 103 based on the start moment of the subsequent group of coded picture frames, so that the first terminal 101 is prevented from conflicting with the at least one second terminal 102 during uplink transmission of the I frame of the subsequent group of coded picture frames.

The plurality of terminals respectively transmit the video streams to the network node 103, and the network node 103 returns the video streams to the control platform 104. The control platform 104 remotely controls the plurality of terminals separately according to the video streams. The plurality of terminals may work autonomously in a distributed manner, and there is no need for mutual coordination and information exchange between the terminals. The network node 103 may allocate resources that support uplink transmission of a group of coded picture frames.

The above is merely an example, and this embodiment is not limited thereto.

The first terminal 101 or the second terminal 102 may be a smart phone (for example, an Android phone or an iOS phone, and the like), a tablet computer, a laptop, a digital broadcast receiver, a mobile Internet Device (MID), a personal digital assistant (PDA), a desktop computer, an on-board terminal (for example, an on-board navigation terminal), a smart speaker, a smart watch, a driver-less vehicle, or the like. The network node 103 may be a base station or the like. The control platform 104 may be an independent physical server, or a server cluster or distributed system composed of a plurality of physical servers, or may be a cloud server or server cluster that provides cloud services, cloud databases, and basic cloud services such as cloud computing, cloud functions, cloud storage, network services, cloud communication, middleware services, domain name services, security services, content delivery networks (CDN), big data, and artificial intelligence platforms. The networks may include, but are not limited to: a wired network and a wireless network, where the wired network includes: a local area network, a metropolitan area network, and a wide area network; and the wireless network includes: Bluetooth, Wi-Fi, and other networks that implement wireless communication, or may be determined based on actual application scenario requirements, which is not limited herein.

Figure 2:
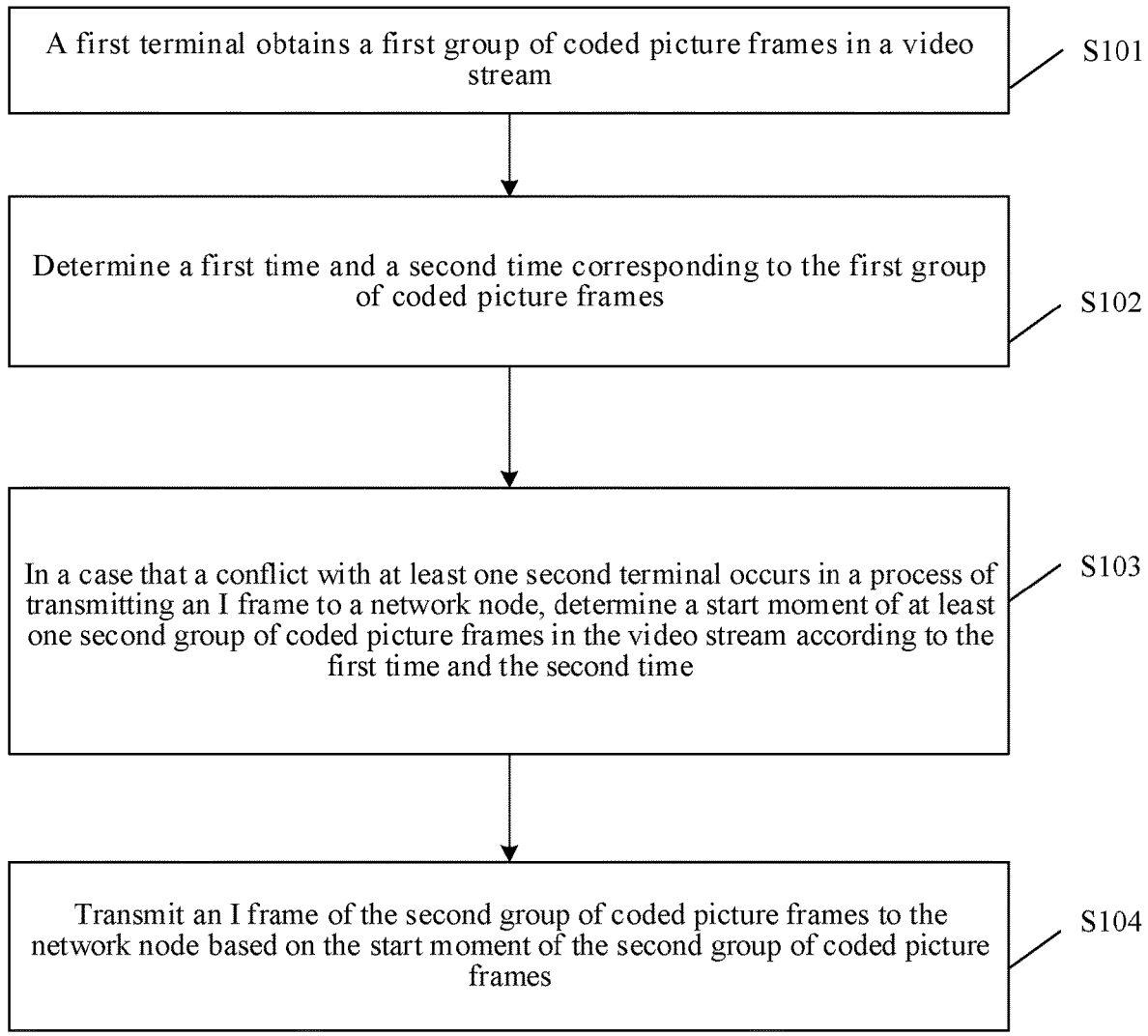
FIG. 2 is a schematic flow chart of a video stream processing method according to an embodiment of this disclosure.

FIG. 2 is a schematic flow chart of another video stream processing method provided in an embodiment of this disclosure. The method may be executed by any electronic equipment, for example, a first terminal. In an embodiment, the method may be executed by a first terminal. For convenience of description, in the description of some embodiments below, descriptions are provided by an example in which the first terminal is used as an execution entity of the method. As shown in FIG. 2, the video stream processing method provided in this embodiment of this disclosure includes the following steps:

In step S101, a first terminal obtains a first group of coded picture frames in a video stream.

In some embodiments, the first terminal may obtain the video stream in various manners by which the video stream may be obtained. For example, the first terminal may obtain the video stream by receiving a video stream transmitted by another terminal, or obtain the video stream locally, or obtain the video stream (for example, a live video stream) from a server.

In other embodiments, the first terminal may alternatively obtain the video stream through video acquisition. For example, the first terminal may be a terminal having a video acquisition device (for example, a camera), and the video stream is acquired by the video acquisition device. For example, the first terminal may be a driver-less truck, a remote driving vehicle, a crane, an overhead traveling crane, and the like.

For example, a driver-less truck collects a video stream about a road surface through a camera, and caches the video stream to a storage device on the driver-less truck. The video stream includes a plurality of GoPs, and the first group of coded picture frames is one GoP in the video stream.

In step S102, determine a first time and a second time corresponding to the first group of coded picture frames.

The first time is a period of time from storing of an I frame of the first group of coded picture frames to transmitting of the I frame to a network node, that is, a period of time from storing of the I frame of the first group of coded picture frames to the first terminal to transmitting of the stored I frame of the first group of coded picture frames to the network node. A start moment of the first time is a moment at which the I frame of the first group of coded picture frames is stored to the first terminal and an end moment of the first time is a moment at which the I frame of the first group of coded picture frames is transmitted to the network node. The second time is a network request protection time.

In an embodiment, the first terminal determines a first time and a second time of the first group of coded picture frames, where the first time is a period of time from storing of the I frame of the first group of coded picture frames to a cache of the first terminal to transmitting of the I frame of the first group of coded picture frames stored in the cache to the network node.

In an embodiment, the cache of the first terminal may be a network cache. For example, in a case that the first terminal is inserted into 5G Customer-Premises Equipment (CPE) or a 5G module, the network cache refers to a network cache of the 5G CPE or the 5G module into which the first terminal is inserted.

Figure 3:
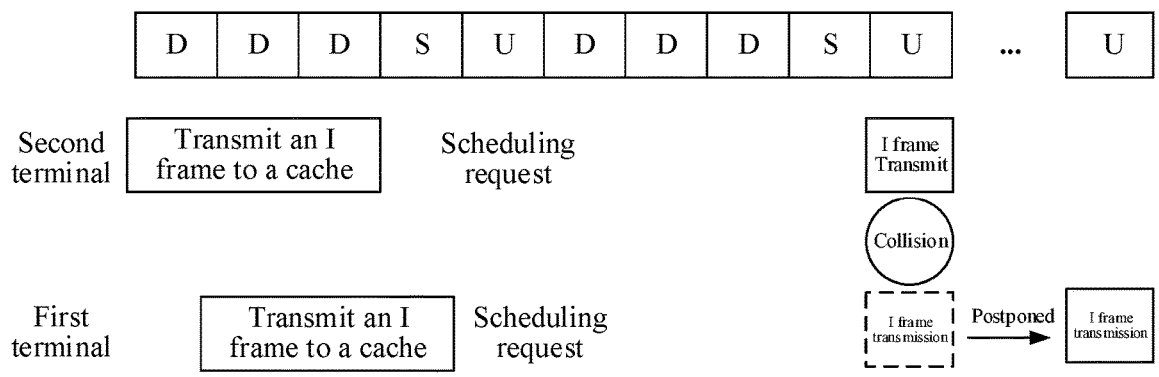
FIG. 3 is a schematic diagram of processing of a video stream according to an embodiment of this disclosure.

For example, as shown in FIG. 3, a time cycle in a 5G network is 5 ms. One time cycle includes three downlink frames D, one uplink frame U, and one special subframe S. A time length of each downlink frame D is 1 ms, a time length of each uplink frame U is 1 ms, and a time length of each special subframe S is 1 ms. The first terminal uses a starting moment at which the I frame of the first group of coded picture frames is stored to the cache of the first terminal as the start moment T0+1 of the first time, and uses an end moment at which the I frame of the first group of coded picture frames in the cache is transmitted to the network node as the end moment T0+15 of the first time. T0 is a starting moment at which a second terminal stores an I frame of a group of coded picture frames of the second terminal to the cache. For example, a value of T0 may be 1000 ms.

In an embodiment, a period of time from the start moment of the first time to the end moment of the first time includes: a time for which the first terminal stores the I frame of the first group of coded picture frames to the cache of the first terminal, a time for which the first terminal transmits a scheduling request to the network node, a time for which the first terminal transmits the I frame of the first group of coded picture frames in the cache to the network node, and the like.

In an embodiment, determining a second time of the first group of coded picture frames includes:

determining the second time according to an obtained network scheduling request time and a preset protection time.

In an embodiment, determining a second time of the first group of coded picture frames includes steps A1 and A2:

Step A1: Determine a minimum period of time from receiving, by the network node, an uplink scheduling request transmitted by a terminal to allocating, by the network node, an uplink resource slot for the uplink scheduling request as a network scheduling request time.

In an embodiment, the network scheduling request time is correlated with configurations of a 5G network. For example, the network scheduling request time is typically 5 milliseconds (ms).

Step A2: Determine a second time, that is, a network request protection time, according to the network scheduling request time and the preset protection time.

In an embodiment, the preset protection time is a cache transmission window protection time. The cache transmission window protection time refers to a redundant time reserved for protecting transmission processing by the network cache. Due to configurations of 5G uplink slots, time for which an I frame can be uploaded is discrete, and therefore a particular cache transmission window protection time can be reserved before a planned uplink slot for transmitting. To ensure that transmission of data is not advanced to a former uplink slot, a value of the cache transmission window protection time needs to be less than a shortest time interval between uplink slots of two 5G frames. For example, a value range of the preset protection time is 2 ms-5 ms. The preset protection time is typically as high as possible, so as to better reduce the fluctuation of an I frame latency during reset of a GoP.

In an embodiment, a sum of the network scheduling request time and the preset protection time is calculated, and the sum is used as the network request protection time.

In step S103, in a case that a conflict with at least one second terminal occurs in a process of transmitting an I frame to a network node, determine a start moment of at least one second group of coded picture frames in the video stream according to the first time and the second time.

The second group of coded picture frames is a group of coded picture frames after the first group of coded picture frames in the video stream. In an actual application, there are a plurality of (at least two) consecutive second groups of coded picture frames after the first group of coded picture frames in the video stream, and a start moment of a second group of coded picture frames is a starting moment at which an I frame of the second group of coded picture frames is stored.

In a case that a conflict with at least one second terminal occurs in a process of transmitting the I frame to the network node, a start moment of a second group of coded picture frames adjacent to the first group of coded picture frames and a start moment of a subsequent group of coded picture frames after the adjacent second group of coded picture frames are determined according to the first time and the second time.

In an embodiment, the start moment of the second group of coded picture frames is a time at which the I frame of the second group of coded picture frames is stored to the cache of the first terminal, and the moment may be a starting moment at which the I frame is stored to the cache of the first terminal.

In an embodiment, a time threshold T1 is a time for which transmission of the I frame needs to take in a non-collision state (non-conflict state). The subsequent group of coded picture frames is a group of coded picture frames subsequent to the second group of coded picture frames adjacent to the first group of coded picture frames.

In an embodiment, the start moment of the subsequent group of coded picture frames is a starting moment at which the I frame of the subsequent group of coded picture frames is stored to the cache of the first terminal. The start moment of the subsequent group of coded picture frames may be determined based on the start moment of the second group of coded picture frames adjacent to the first group of coded picture frames and a GoP cycle (a group of coded picture frames cycle). In an embodiment, a sum of the start moment of the second group of coded picture frames adjacent to the first group of coded picture frames and an integer multiple of the GoP cycle is used as the start moment of the subsequent group of coded picture frames. For example, in a case that the start moment of the second group of coded picture frames adjacent to the first group of coded picture frames is set to T, a start moment of the third second group of coded picture frames after the first group of coded picture frames is: a sum of the start moment of the second group of coded picture frames adjacent to the first group of coded picture frames and two GoP cycles.

For example, in a case that the start moment corresponding to the second group of coded picture frames is T0+N, the GoP cycle is M, a start moment corresponding to a next group of coded picture frames (a group of coded picture frames 1) adjacent to the second group of coded picture frames is T0+N+M. T0 is a starting moment at which the second terminal stores the I frame of the group of coded picture frames of the second terminal to the cache, and N and M are positive integers. For example, in a case that a value of N is 6 ms and a value of M is 500 ms, T0+N+M is T0+506 ms, and in a case that T0 is 1000 ms, T0+506 ms is 1506 ms; and a corresponding start moment of the group of coded picture frames 1 is 1506 ms. In a case that a next group of coded picture frames adjacent to the group of coded picture frames 1 is a group of coded picture frames 2, and so on, a next group of coded picture frames adjacent to a group of coded picture frames Q−1 is a group of coded picture frames Q, where Q is a positive integer, a start moment corresponding to the group of coded picture frames Q is T0+N+Q×M. For example, in a case that a value of N is 6 ms, a value of m is 500 ms, and a value of Q is 20, the start moment corresponding to the group of coded picture frames 20 is T0+6+20×500, that is, T0+10006 ms; and in a case that a value of T0 is 1000 ms, T0+10006 ms is 11006 ms, and the start moment corresponding to the group of coded picture frames 20 is 11006 ms.

In an embodiment, the preset time threshold is determined by at least one of the network scheduling request time and an uplink frame waiting time corresponding to the I frame.

In an embodiment, a time threshold is obtained by summing up the network scheduling request time and the uplink frame waiting time corresponding to the I frame. The uplink frame waiting time corresponding to the I frame is an uplink frame waiting time to be taken by actual transmission of the I frame.

For example, under a 3D1U frame configuration, the network scheduling request time is 5 ms, and the uplink frame waiting time is: the number of uplink frames occupied is ×5 ms.

In an embodiment, the cache has a waiting window period, T1 may be configured to be further added with a decision protection interval, and a time required to transmit an I frame in a non-collision state<T1<a time required to transmit an I frame in a collision state. A sum of the network scheduling request time and the uplink frame waiting time corresponding to the I frame is calculated, to obtain the time required to transmit an I frame in the non-collision state. A sum of the time required to transmit an I frame in the non-collision state and the decision protection interval is calculated, to obtain the time required to transmit an I frame in the collision state. The network scheduling request time is a minimum period of time from receiving, by the network node, an uplink scheduling request transmitted by a terminal to allocating, by the network node, an uplink resource slot for the uplink scheduling request. The uplink frame waiting time corresponding to the I frame is an uplink frame waiting time to be taken by actual transmission of the I frame. The decision protection interval refers to a redundant time used for preventing inaccurate determining of a 5G uplink slot for uploading of an I frame due to a jitter in a cache empty time. Due to configurations of 5G uplink slots, time for which an I frame can be uploaded is discrete, and therefore a decision protection window, that is, a decision protection interval, can be set according to the uplink slot time interval. A value of the decision protection window is less than a shortest time interval between uplink slots of two 5G frames.

For example, the decision protection interval may be a frame interval of 1 ms; and a value of T1 may be 11 ms.

In some embodiments, the first terminal may determine that a conflict with at least one second terminal occurs in a process of transmitting an I frame to the network node:

the first terminal compares the first time and a preset time threshold, and determines whether a preset condition is met; and in a case that the first time is greater than the preset time threshold and the preset condition is met, the first terminal determines that a conflict with at least one second terminal occurs in the process of transmitting the I frame to the network node.

The preset condition includes at least one of the following:

uplink transmission of the I frame of the first group of coded picture frames is the first uplink transmission of the I frame of the video stream;

fourth times of a plurality of consecutive third groups of coded picture frames in the video stream are all greater than a time threshold, a fourth time is an uplink transmission duration of an I frame of a third group of coded picture frames, and the uplink transmission duration is a period of time from storing of the I frame of the third group of coded picture frames to the first terminal to transmitting of the stored I frame of the third group of coded picture frames to the network node; the plurality of third groups of coded picture frames are groups of coded picture frames before the first group of coded picture frames; and the first time is greater than a sum of the time threshold and a frame cycle of the video stream.

In an embodiment, for the first terminal, for example, a video device, a duration of the GoP cycle is set to an integer multiple of a frame cycle of a 5G network. For example, the frame cycle of the 5G network may be 5 ms. During uplink transmission of the I frame by the first terminal, the I frame is transmitted to a network cache of a 5G module/chip of the first terminal, and the first terminal monitors a change in the cache. In a case that the first time T2 is greater than the preset time threshold T1 and the preset condition is met, the start moment corresponding to the second group of coded picture frames in the video stream is determined according to the first time T2 and a second time T3. The preset condition includes at least one of the following:

first uplink transmission of the I frame;

for a plurality of consecutive times (for example, the times may be set to 2 to 3 times, and a larger total number of terminals indicates a larger number of times that can be set) of transmission of the I frame, and in a case that the I frame in the cache is transmitted and empty of the cache is timeout each time, for example, T2 is greater than T1, it indicates that there are consecutive collisions (conflicts) between the first terminal and at least one second terminal, which is not accidental;

T2 is greater than T1+1 frame cycle; for example, the 1 frame cycle may be 5 ms.

In an embodiment, the start moment of the second group of coded picture frames after the first group of coded picture frames can be determined according to the first time and the second time by using the following methods:

the start moment of the second group of coded picture frames is determined according to a start moment of the first time, a third time, and a preset group of coded picture frames cycle, the start moment of the first time being a starting moment at which the I frame of the first group of coded picture frames is stored, where the third time is determined according to the first time and the second time, and the third time is an I frame transmit adjustment time.

In an embodiment, determining the start moment of the second group of coded picture frames after the first group of coded picture frames according to the first time and the second time includes steps B1 and B2:

Step B1: Obtain the third time according to the first time and the second time, where the third time is an I frame transmit adjustment time.

In an embodiment, obtaining a third time according to the first time and the second time includes:

calculating a difference between the first time and the second time, to obtain the third time.

For example, a difference between the first time T2 and the second time T3 is calculated, to obtain a third time T4, where in a case that a value of T2 is 14 ms and a value of T3 is 9 ms, a value of T4 is 5 ms.

In an embodiment, determining a third time according to the first time and the second time includes:

determining the third time according to a frame cycle of the video stream, the first time, and the second time, where the third time is an integer multiple of the frame cycle; and determining the third time according to a frame cycle of the video stream, the first time, and the second time includes:

calculating a difference between the first time and the second time, to obtain a first value;

obtaining a second value according to m times of the frame cycle of the video stream and the first value; and in a case that the second value is a minimum non-negative integer, determining that the third time is m times the frame cycle of the video stream, where m is a positive integer.

In an embodiment, the third time T4 is determined according to the frame cycle T7 of the video stream, the first time T2, and the second time T3. For example, the difference between the first time T2 and the second time T3 is calculated, and the first value is determined to be T2−T3. A second value n is obtained according to m times of the frame cycle of the video stream and the first value T2−T3, and in a case that the second value n is the minimum non-negative integer, it is determined that the third time T4 is m×T7, where m is a value that enables m×T7−T2+T3 to be a minimum non-negative integer n.

For example, T4=m×T7, where m is a value that enables m×T7−T2+T3 to be the minimum non-negative integer n. In a case that a value of T7 is 16.6 ms, a value of T2 is 14 ms, and a value of T3 is 9 ms, the first value is T2−T3 ms, that is, the first value is 5 ms, and m×T7−T2+T3=16.6m−5; in a case that m is 1, 16.6m−5 is the minimum non-negative integer 12, that is, the second value n is 12; and T4=m× T7=1× T7=16.6 ms.

Step B2: Determine the start moment of the second group of coded picture frames according to the start moment of the first time, the third time, and the preset group of coded picture frames cycle, the start moment of the first time being a starting moment at which the I frame of the first group of coded picture frames is stored to the cache of the first terminal.

In an embodiment, the preset group of coded picture frames cycle is a GoP cycle, and one GoP cycle is a distance between two adjacent I frames.

For example, the start moment corresponding to the second group of coded picture frames is determined according to a start moment (T0+1) of the first time, a third time T4, and a preset group of coded picture frames cycle 500 ms. T0 is a starting moment at which the second terminal stores an I frame of the group of coded picture frames of the second terminal to the cache, the start moment corresponding to the second group of coded picture frames is (T0+1)+T4+N×500, and N is a positive integer; and in a case that a value of N is 1 and a value of T4 is 5 ms, the start moment corresponding to the second group of coded picture frames is T0+506 ms.

In step S104, transmit an I frame of the second group of coded picture frames to the network node based on the start moment of the second group of coded picture frames.

In an actual application, after storing the I frame of the second group of coded picture frames to the first terminal based on the start moment of the second group of coded picture frames, the first terminal transmits the stored I frame of the second group of coded picture frames to the network node.

In an embodiment, after storing the I frame of the second group of coded picture frames to the cache of the first terminal based on the start moment of the second group of coded picture frames, the first terminal transmits the I frame of the second group of coded picture frames stored in the cache to the network node, so as to avoid a conflict between the first terminal and the at least one second terminal during uplink transmission of the I frames.

Figure 4:
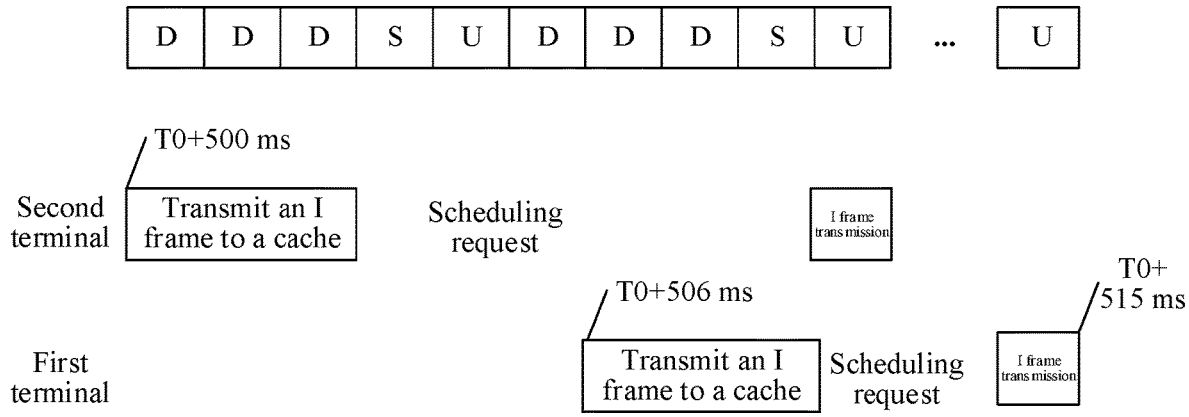
FIG. 4 is a schematic diagram of processing of a video stream according to an embodiment of this disclosure.

For example, as shown in FIG. 4, a time cycle in a 5G network is 5 ms. One time cycle includes three downlink frames D, one uplink frame U, and one special subframe S. A time length of each downlink frame D is 1 ms, a time length of each uplink frame U is 1 ms, and a time length of each special subframe S is 1 ms. After storing the I frame of the second group of coded picture frames to the cache based on the start moment T0+506 ms of the second group of coded picture frames, the first terminal transmits the I frame of the second group of coded picture frames stored in the cache to a base station. The first terminal completes transmission of the I frame at the time T0+515 ms, so that the first terminal is prevented from conflicting with the second terminal during uplink transmission of the I frame. The starting moment at which the second terminal stores the I frame of the group of coded picture frames of the second terminal to the cache is T0+500 ms.

For example, as shown in FIG. 4, the first terminal transmits the start moment T0+506 ms of the second group of coded picture frames to the base station, to instruct the base station to allocate a resource supporting uplink transmission of the second group of coded picture frames according to the start moment T0+506 ms of the second group of coded picture frames.

In an embodiment, in a case that the I frame of the second group of coded picture frames is obtained after the start moment of the second group of coded picture frames, the I frame of the second group of coded picture frames is stored to the first terminal, and the I frame of the second group of coded picture frames is transmitted to the network node.

In an embodiment, in a case that the I frame of the second group of coded picture frames is obtained after the start moment of the second group of coded picture frames, the I frame of the second group of coded picture frames is stored to the network cache of the first terminal.

In an embodiment, the first terminal encodes and obtains the I frame of the second group of coded picture frames before the start moment of the second group of coded picture frames. Therefore, the first terminal caches the I frame at the start moment of the second group of coded picture frames.

In an embodiment, in an abnormal situation, the first terminal encodes and obtains the I frame of the second group of coded picture frames after the start moment of the second group of coded picture frames, and therefore the first terminal caches the I frame after the start moment of the second group of coded picture frames.

In an embodiment, by resetting the video stream or adjusting the length of the first group of coded picture frames, the I frame of the second group of coded picture frames is obtained at the start moment corresponding to the second group of coded picture frames, and the obtained I frame of the second group of coded picture frames is stored to the first terminal.

In an embodiment, by resetting the video stream or adjusting the length of the first group of coded picture frames, the I frame of the second group of coded picture frames is obtained at the start moment corresponding to the second group of coded picture frames, and the obtained I frame of the second group of coded picture frames is stored to the network cache of the first terminal.

In this embodiment of this disclosure, in a case that the first time is greater than the preset time threshold and the preset condition is met, it indicates that during transmission of the I frame of the first group of coded picture frames by the first terminal, the first terminal conflicts with at least one second terminal during uplink transmission of the I frame of the first group of coded picture frames. After the I frame of the second group of coded picture frames is stored to the cache of the first terminal based on the determined start moment of the second group of coded picture frames, the I frame of the second group of coded picture frames stored in the cache is transmitted to the network node, so that the first terminal can be prevented from conflicting with the at least one second terminal during uplink transmission of the I frame of the second group of coded picture frames, thereby reducing the latency in transmission of the video stream transmission and alleviating the latency jitter.

To better understand the method provided in this embodiment of this disclosure, the following describes the video stream processing method provided in this embodiment of this disclosure in combination with an application scenario of driver-less driving. The video stream processing method provided in this embodiment of this disclosure is applied to a driver-less vehicle. In other words, the first terminal mentioned above is a driver-less vehicle or is disposed in the driver-less vehicle.

For example, as shown in FIG. 3, a scenario of two terminals in a 5G network is used as an example for illustration. The two terminals include a first terminal and a second terminal, where the first terminal represents a driver-less vehicle 1 and the second terminal represents a driver-less vehicle 2. A time cycle in a 5G network is 5 ms. One time cycle includes three downlink frames D, one uplink frame U, and one special subframe S. A time length of each downlink frame D is 1 ms, a time length of each uplink frame U is 1 ms, and a time length of each special subframe S is 1 ms. The collision as shown in FIG. 3 occurs between the first terminal and the second terminal during first uplink transmission of the I frame, resulting in that transmission of the I frame of the first terminal is postponed by 5 ms. The start moment at which the second terminal stores the I frame of the group of coded picture frames of the second terminal to the cache is T0, the start moment at which the first terminal stores the I frame of the first group of coded picture frames to the cache of the first terminal is taken as the start moment T0+1 ms of the first time, and the end moment at which the first terminal transmits the I frame of the first group of coded picture frames in the cache to the base station is taken as the end moment T0+15 ms of the first time. As shown in FIG. 4, a time cycle in a 5G network is 5 ms. One time cycle includes three downlink frames D, one uplink frame U, and one special subframe S. A time length of each downlink frame D is 1 ms, a time length of each uplink frame U is 1 ms, and a time length of each special subframe S is 1 ms. In a case that the cache empty time (first time) T2 of the first terminal is 14 ms and T2 is greater than T1 set by the first terminal, where T1 is 11 ms, the first terminal starts an I frame uplink transmission adjustment process. In a case that the second time T3 is 9 ms and the third time T4 is 5 ms, the start moment of I frame transmission of the GoP cycle reset by the first terminal is T0+6 ms. In a case that the duration of the GoP cycle is 500 ms, a transmission moment of an I frame (an I frame in the second group of coded picture frames) in a next GoP cycle of the first terminal is T0+506 ms, that is, the start moment corresponding to the second group of coded picture frames of the first terminal is T0+506 ms. The first terminal and the second terminal avoid I frame collision in uplink transmission of I frames in the group of coded picture frames of subsequent GoP cycles.

In this embodiment of this disclosure, in a scenario of real-time remote control in a 5G dedicated network, a plurality of industry devices (terminals) need to be remotely controlled in the scenario. For example, a video is acquired in real time by a video acquisition device such as a camera of an industry device, and the video is coded and then transmitted back through the 5G dedicated network (for example, a base station). After a control end (for example, a control platform) receives the video transmitted from the 5G dedicated network, the control end remotely controls the industry device according to a situation of the video. Data uplink transmission may refer to back transmission of a video stream. Video stream data has a high cyclical rule. Therefore, by the video stream processing method provided in this embodiment of this disclosure, an I frame uplink transmission collision between a plurality of terminals can be avoided, thereby reducing the latency in video transmission and the latency jitter. In a case that there are other uplink data services of large bandwidth in the 5G dedicated network, a scheduling priority of a video stream terminal may be set to the highest in network configurations, and the video stream processing method provided in this embodiment of this disclosure may still work effectively.

In an embodiment, a plurality of terminals acquire soil specimens in a harsh environment, and the terminals may be artificial intelligence devices, for example, robots. A plurality of robots acquire video streams of a surrounding environment through cameras carried by the robots, the plurality of robots store I frames of groups of coded picture frames in the video streams acquired by the plurality of robots to respective caches, and a No. 1 robot among the plurality of robots determines a first time and a second time corresponding to a first group of coded picture frames, the first time is a period of time from storing of an I frame of the first group of coded picture frames to the cache of the first terminal to transmitting of the I frame of the first group of coded picture frames in the cache to a base station, and the second time is a network request protection time. In a case that the first time is greater than a preset time threshold and a preset condition is met, it indicates that during transmission of the I frame of the first group of coded picture frames by the No. 1 robot, the No. 1 robot conflicts with another robot during uplink transmission of the I frame of the first group of coded picture frames; the No. 1 robot determines a start moment corresponding to the second group of coded picture frames in the video stream according to the first time and the second time, the second group of coded picture frames is after the first group of coded picture frames, and the start moment corresponding to the second group of coded picture frames is a starting moment at which the I frame of the second group of coded picture frames is stored to the cache; and after the No. 1 robot stores the I frame of the second group of coded picture frames to the cache based on the start moment corresponding to the second group of coded picture frames, the I frame of the second group of coded picture frames stored in the cache is transmitted to the base station, and in this case, the base station allocates resources supporting uplink transmission of the group of coded picture frames, so that the No. 1 robot is prevented from conflicting with other robots during uplink transmission of the I frame. The plurality of robots transmit video streams to a same base station separately, and the base station transmits the video streams back to a remote control platform through a network. The control platform remotely controls the plurality of robots according to the video streams, respectively, so that the robots can avoid obstacles and quickly find target soil. The plurality of robots may work autonomously in a distributed manner, and there is no need for mutual coordination and information exchange between the robots.

Figure 5:
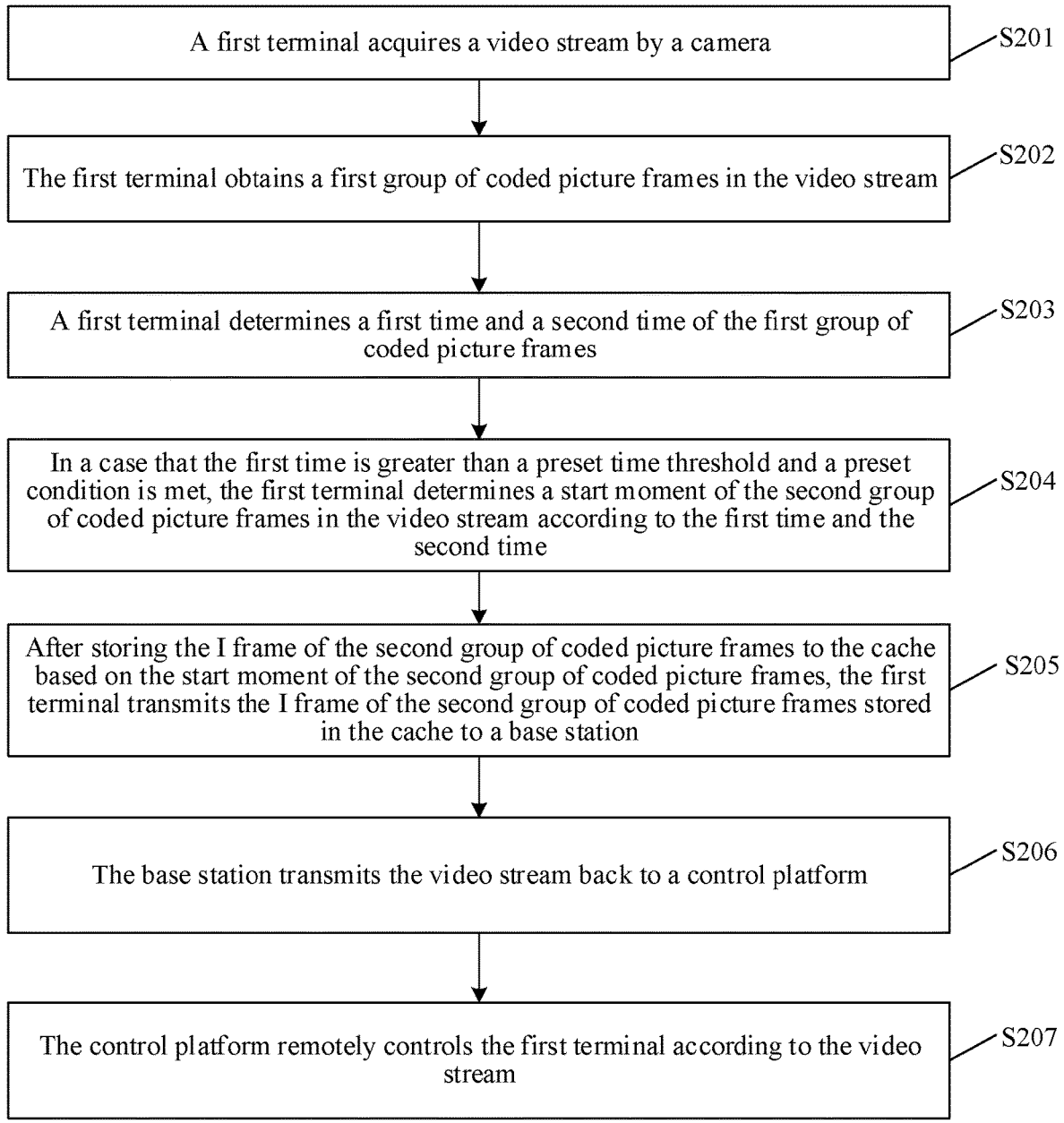
FIG. 5 is a schematic flow chart of another video stream processing method according to an embodiment of this disclosure.

FIG. 5 is a schematic flow chart of a video stream processing method provided in an embodiment of this disclosure. The method may be executed by any electronic equipment, for example, a first terminal. In an embodiment, descriptions are provided by an example in which the first terminal is used as an execution entity of the method. As shown in FIG. 5, the video stream processing method provided in this embodiment of this disclosure includes the following steps:

In step S201, a first terminal acquires a video stream by a camera.

In an embodiment, the first terminal may be a driver-less vehicle, and content in the video stream is correlated with a road surface on which the driver-less vehicle is traveling.

In step S202, the first terminal obtains a first group of coded picture frames in the video stream.

In step S203, the first terminal determines a first time and a second time of the first group of coded picture frames.

In an embodiment, the first time is a period of time from storing, by the first terminal, of the I frame of the first group of coded picture frames to transmitting of the I frame to a network node, and the second time is a network request protection time.

In step S204, in a case that the first time is greater than a preset time threshold and a preset condition is met, the first terminal determines a start moment of the second group of coded picture frames in the video stream according to the first time and the second time.

In an embodiment, the second group of coded picture frames is received after the first group of coded picture frames, and the start moment of the second group of coded picture frames is a starting moment of storing the I frame of the second group of coded picture frames to a cache of the first terminal.

In an embodiment, in a case that the first time is greater than the preset time threshold and the preset condition is met, it indicates that the first terminal conflicts with at least one second terminal during uplink transmission of the I frame of the first group of coded picture frames.

Content included in the preset condition can be found in the description in the foregoing embodiments, and details are not described herein again.

In step S205, after storing the I frame of the second group of coded picture frames to the cache based on the start moment of the second group of coded picture frames, the first terminal transmits the I frame of the second group of coded picture frames stored in the cache to a base station.

In an embodiment, the first terminal transmits the video stream and the I frame of the second group of coded picture frames stored in the cache and included in the video stream to the base station, so that the first terminal is prevented from conflicting with a plurality of second terminals during uplink transmission of the I frame.

In step S206, the base station transmits the video stream back to a control platform.

In step S207, the control platform remotely controls the first terminal according to the video stream.

In an embodiment, the control platform remotely controls the driver-less vehicle according to relevant video stream of the road surface on which the driver-less vehicle is traveling, thereby enhancing the driving safety of the driver-less vehicle.

In this embodiment of this disclosure, reduction of collision during transmission of I frames of video streams by a plurality of terminals in a 5G dedicated network scenario is implemented, and the latency in transmission of the video stream and the latency jitter are alleviated. By using the properties of perception of a network transmission cache and resource scheduling of a base station, a plurality of terminals in the 5G dedicated network can refresh time locations of uplink transmission of I frames of the terminals without negotiation, thereby avoiding the collision between the plurality of terminals in uplink transmission of the I frames.

The video stream processing method provided in this embodiment of this disclosure is continuously described. In some embodiments, the video stream processing method provided in this embodiment of this disclosure includes the following steps:

In step S301, a first terminal determines a first time T2.

In an embodiment, in a case that the first terminal calls a data transmit interface of a 5G module/chip to transmit I frame data, the first terminal reads the size of a network cache every cycle of 1 ms, and in a case that the size of the network cache is reduced to 0, the number of elapsed time cycles is recorded as T2 with the unit of ms.

In step S302, determine a third time T4 according to the first time T2 and a second time T3.

In an embodiment, T4 is determined in either of the following two methods:

Method 1: calculating a difference between the first time T2 and the second time T3, to obtain the third time T4, that is, $T4=T2-T3$, where T3 is a configuration parameter. For example, in a case that a value of T2 is 14 ms, a value of T3 is 9 ms, a value of T4 is 5 ms.

Method 2: determining the third time T4 according to a frame cycle T7 of a video stream, the first time T2, and the second time T3. For example, $T4=m \times T7$, where m is a value that enables $m \times T7 - T2 + T3$ to be a minimum non-negative integer n.

For example, in a case that a value of T7 is 16.6 ms, a value of T2 is 14 ms, and a value of T3 is 9 ms, $m \times T7-$ T2+T3=16.6m−5; in a case that m is 1, 16.6m−5 is the minimum non-negative integer 12, that is, n is 12; and T4=m×T7=1× T7=16.6 ms.

In step S303, determine a start moment of a reset GoP cycle based on the third time T4.

In an embodiment, the start moment of the reset GoP cycle may be a start moment of a second group of coded picture frames in the video stream.

In step S304, the first terminal notifies a video receive end of the start moment of the reset GoP cycle.

In an embodiment, the video receive end may be a base station. The start moment of the reset GoP cycle may be the start moment corresponding to the second group of coded picture frames in the video stream, for example, the start moment corresponding to the second group of coded picture frames in the frequency stream is T0+506 ms.

In step S305, perform subsequent video frame coding and transmission based on the reset start moment of the GoP cycle.

In an embodiment, the start moment of the reset GoP cycle may be a start moment corresponding to the second group of coded picture frames in the video stream.

In an embodiment, the input video stream is reset, so that arrival of an I frame of the video stream is postponed by T4, for example, T4=5 ms. The operation is to disconnect the video stream, wait for a video stream reconstruction time T4, and then re-construct the video stream; according to a GoP frame sequence number, in a case that the GoP frame sequence number is the first frame, an I frame coding identity is outputted, to perform I frame coding on the current frame, to obtain an I frame; after coding, whether a current moment is later than the reset I frame start moment+ n×GoP cycle, that is, the start moment corresponding to the second group of coded picture frames in the video stream is determined. For example, the reset I frame start moment+ n×GoP cycle=(T0+6)+1×500=T0+506 ms, where n is 1 and n is a current GoP cycle number; and in a case that the current moment is later than the reset I frame start moment+ n×GoP cycle, an I frame transmit identity is outputted, to perform I frame data transmission. Normal situation: the current moment (for example, T0+505 ms) is earlier than the reset I frame start moment+n×GoP cycle, for example, the reset I frame start moment+n×GoP cycle=T0+506 ms. Abnormal situation: the current moment (for example, T0+507 ms) is later than the reset I frame start moment+n× GoP cycle, for example, the reset I frame start moment+n× GoP cycle=T0+506 ms.

In an embodiment, under the condition that the video stream is not disconnected, for a current frame arrival time t2: in a case that t2 is within an interval [reset I frame start moment+n×GoP cycle−I frame coding time, reset I frame start moment+n×GoP cycle−I frame coding time+frame cycle], an I frame coding identity is outputted, to perform I frame coding on the current frame, to obtain an I frame; and after coding, whether the current moment is later than the reset I frame start moment+n×GoP cycle, where n is a current GoP cycle number, and in a case that the current moment is later than the reset I frame start moment n×GoP cycle, an I frame transmit identity is outputted, to perform I frame data transmission.

Figure 6:
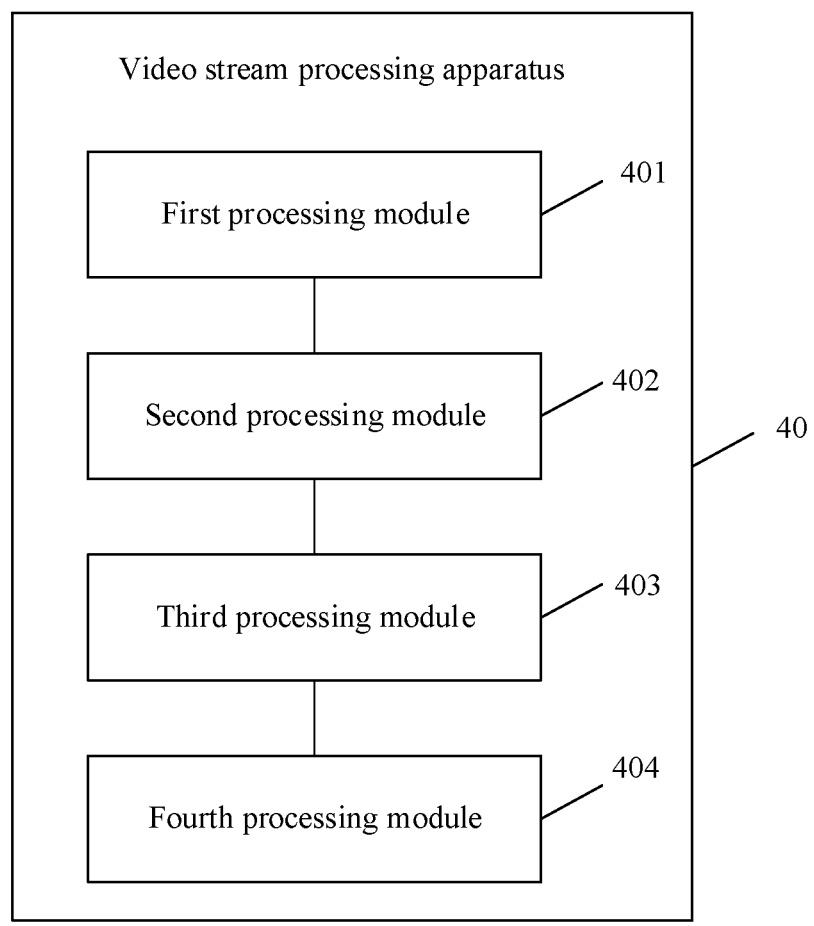
FIG. 6 is a schematic structural diagram of a video stream processing apparatus according to an embodiment of this disclosure.

Based on the same concept, an embodiment of this disclosure further provides a video stream processing apparatus. The apparatus may be disposed in a first terminal, and a schematic structural diagram of the apparatus is shown in FIG. 6. A video stream processing apparatus 40 includes a first processing module 401, a second processing module 402, a third processing module 403, and a fourth processing module 404. One or more modules, submodules, and/or units of the apparatus can be implemented by processing circuitry, software, or a combination thereof, for example.

The first processing module 401 is configured to obtain a first group of coded picture frames in a video stream.

The second processing module 402 is configured to determine a first time and a second time corresponding to the first group of coded picture frames, the first time being a period of time from storing of an I frame of the first group of coded picture frames to transmitting of the stored I frame to a network node, and the second time being a network request protection time.

The third processing module 403 is configured to: in a case that a conflict with at least one second terminal occurs in a process of transmitting the I frame to the network node, determine a start moment of at least one second group of coded picture frames in the video stream according to the first time and the second time, the second group of coded picture frames being after the first group of coded picture frames.

The fourth processing module 404 is configured to transmit an I frame of the second group of coded picture frames to the network node based on the start moment of the second group of coded picture frames.

In an embodiment, the second processing module 402 is further configured to determine the second time according to an obtained network scheduling request time and a preset protection time.

In an embodiment, the third processing module 403 is further configured to determine a start moment of the second group of coded picture frames according to a start moment of the first time, a third time, and a preset group of coded picture frames cycle, the start moment of the first time being a starting moment at which the I frame of the first group of coded picture frames is stored to the first terminal, where the third time is determined according to the first time and the second time, and the third time is an I frame transmit adjustment time.

In an embodiment, the third processing module 403 is further configured to determine the third time according to a frame cycle of the video stream, the first time, and the second time, where the third time is an integer multiple of the frame cycle.

In an embodiment, the third processing module 403 is further configured to calculate a difference between the first time and the second time, to obtain a first value; obtain a second value according to m times of the frame cycle of the video stream and the first value; and in a case that the second value is a minimum non-negative integer, determine that the third time is m times the frame cycle of the video stream, where m is a positive integer.

In an embodiment, the fourth processing module 404 is further configured to in a case that the I frame of the second group of coded picture frames is obtained after the start moment of the second group of coded picture frames, store the I frame of the second group of coded picture frames to the first terminal, and transmit the I frame of the second group of coded picture frames to the network node.

In an embodiment, the fourth processing module 404 is further configured to reset the video stream or adjust the length of the first group of coded picture frames, obtain the I frame of the second group of coded picture frames at the start moment corresponding to the second group of coded picture frames, and store the obtained I frame of the second group of coded picture frames to the first terminal.

In an embodiment, the preset time threshold is determined by at least one of the network scheduling request time and an uplink frame waiting time corresponding to the I frame.

In an embodiment, the preset condition includes at least one of the following:

uplink transmission of the I frame of the first group of coded picture frames is the first uplink transmission of the I frame of the video stream;

fourth times of a plurality of consecutive third groups of coded picture frames in the video stream are all greater than a time threshold, a fourth time is an uplink transmission duration of an I frame of a third group of coded picture frames, that is, a period of time from storing of the I frame of the third group of coded picture frames to the first terminal to transmitting of the stored I frame of the third group of coded picture frames to the network node, and the plurality of third groups of coded picture frames are before the first group of coded picture frames; and the first time is greater than a sum of the time threshold and a frame cycle of the video stream.

The embodiments of this disclosure can include at least the following beneficial effects:

In a case that a first terminal conflicts with at least one second terminal during uplink transmission of an I frame of a first group of coded picture frames, a start moment of at least one second group of coded picture frames after the first group of coded picture frames in a video stream is determined according to a first time and a second time, and an I frame of the second group of coded picture frames is transmitted to a network node based on the determined start moment of the second group of coded picture frames; in this way, because the first time is a period of time from storing of the I frame of the first group of coded picture frames to transmitting of the I frame to the network node and the second time is a network request protection time, even if the first terminal is scheduled to perform transmission of the I frame in a subsequent time cycle by a base station, the start moment of the at least one second group of coded picture frames after the first group of coded picture frames can dynamically change with a change in the first time due to the fact that the second group of coded picture frames is determined according to the first time and the second time, so as to prevent the first terminal from conflicting with the second terminal in a process of transmitting the I frame of the second group of coded picture frames to the network node, thereby reducing the latency in transmission of the video stream and alleviating the latency jitter.

Figure 7:
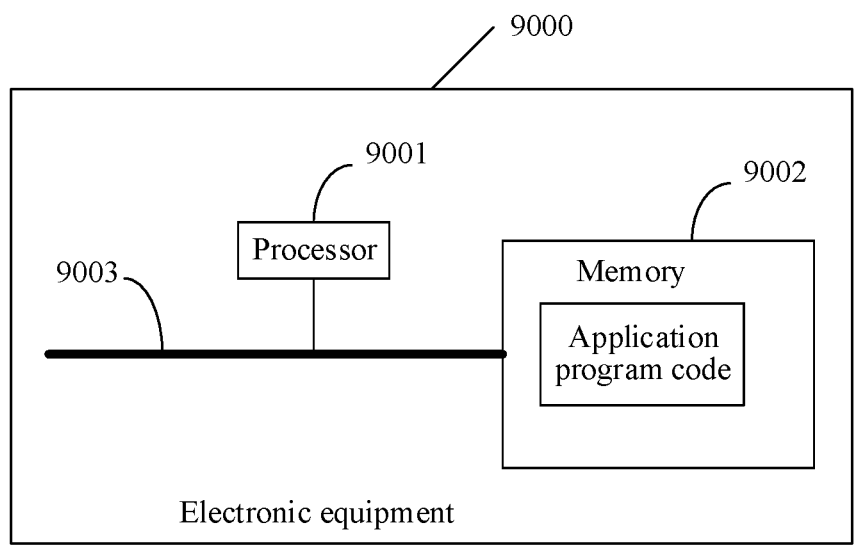
FIG. 7 is a schematic structural diagram of electronic equipment according to an embodiment of this disclosure.

Based on the same concept, an embodiment of this disclosure further provides electronic equipment. A schematic structural diagram of the electronic equipment is shown in FIG. 7. Electronic equipment 9000 includes at least one processor 9001, a memory 9002, and a bus 9003, at least one processor 9001 being electrically connected to the memory 9002. The memory 9002 is configured to store at least one computer-executable instruction, and the processor 9001 is configured to execute the at least one computer-executable instruction, so as to perform the video stream processing method provided in this embodiment of this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In some embodiments, processing circuitry, such as the processor 9001, may be a Field-Programmable Gate Array (FPGA) or other device with logic processing capabilities, such as a Microcontroller Unit (MCU), a Central Process Unit (CPU).

Based on the same concept, an embodiment of this disclosure further provides a computer-readable storage medium, such as a non-transitory computer-readable storage medium, storing a computer program. The computer program, when executed by a processor, implements the steps of the video stream processing method provided in this embodiment of this disclosure.

An embodiment of this disclosure further provides a computer program product, including a computer program or instructions, and the computer program or the instructions, when executed by a processor, implementing the video stream processing method provided in this embodiment of this disclosure.

The computer-readable storage medium provided in this embodiment of this disclosure includes, but is not limited to, any type of disk (including a floppy disk, a hard disk, an optical disk, a CD-ROM disk, and a magnetic optical disk), a read-only memory (ROM), a random access memory (RAM), an erasable programmable read-only memory (EPROM), an electrically erasable programmable read-only memory (EEPROM), a flash memory, a magnetic card, or an optical card. In other words, the readable storage medium includes any medium that stores or transmits information in a readable form by a device (for example, a computer).

An embodiment of this disclosure further provides a computer program product including instructions, and the computer program product, when executed on a computer device, causing the computer device to perform the video stream processing method provided in this embodiment of this disclosure.

Those skilled in the art may understand that a computer program may be used to implement each block in these structural diagrams and/or block diagrams and/or flow charts and a combination of blocks in these structural diagrams and/or block diagrams and/or flow charts. Those skilled in the art may understand that these computer program products may be provided to a general-purpose computer, a professional computer, or a processor of another programmable data processing method for implementation, so that the solutions specified in the block or blocks of the structural diagrams and/or block diagrams and/or flow charts disclosed in this disclosure are executed by the computer or the processor of another programmable data processing method.

Other embodiments in addition to the above embodiments of this disclosure are falling within the scope of protection of this disclosure.

What is claimed is:

1. A video stream processing method, comprising:

receiving a first group of coded picture frames in a video stream;

determining a storage time and a network request protection time corresponding to the first group of coded picture frames, the storage time being an amount of time an intra frame of the first group of coded picture frames is stored for transmission to a network node;

when the storage time is greater than a preset time threshold and a preset condition is met, indicating a transmission conflict with at least one second terminal occurs in a process of transmitting the intra frame to the network node, determining a start time of at least a second group of coded picture frames in the video stream according to the storage time and the network request protection time, the second group of coded picture frames being after the first group of coded picture frames; and transmitting an intra frame of the second group of coded picture frames to the network node based on the start time of the second group of coded picture frames.

2. The method according to claim 1, wherein the determining the network request protection time comprises:
determining the network request protection time based on an obtained network scheduling request time and a preset protection time.

3. The method according to claim 1, wherein the determining the start time of at least the second group of coded picture frames comprises:
determining the start time of the second group of coded picture frames according to a start time of the storage of the intra frame of the first group of coded picture frames for transmission, an intra frame transmit adjustment time, and a preset group of coded picture frames cycle.

4. The method according to claim 3, further comprising:
determining the intra frame transmit adjustment time according to a frame cycle of the video stream, the storage time, and the network request protection time, wherein
the intra frame transmit adjustment time is an integer multiple of the frame cycle.

5. The method according to claim 4, wherein the determining the intra frame transmit adjustment time comprises:
calculating a difference between the storage time and the network request protection time, to obtain a first value;
obtaining a second value based on m times the frame cycle of the video stream and the first value; and
when the second value is a minimum non-negative integer, determining m times of the frame cycle of the video stream as the intra frame transmit adjustment time, wherein m is a positive integer.

6. The method according to claim 1, wherein the transmitting the intra frame of the second group of coded picture frames comprises:
when the intra frame of the second group of coded picture frames is obtained after the start time of the second group of coded picture frames, storing the intra frame of the second group of coded picture frames by a first terminal, and transmitting the intra frame of the second group of coded picture frames to the network node.

7. The method according to claim 1, further comprising:
resetting the video stream or adjusting a length of the first group of coded picture frames;
obtaining the intra frame of the second group of coded picture frames at the start time corresponding to the second group of coded picture frames; and
storing the obtained intra frame of the second group of coded picture frames by a first terminal.

8. The method according to claim 1, further comprising:
when the storage time is greater than the preset time threshold and the preset condition is met, determining that the transmission conflict with the at least one second terminal occurs in the process of transmitting the intra frame of the first group of coded picture frames to the network node.

9. The method according to claim 8, wherein the preset time threshold is determined by at least one of a network scheduling request time or an uplink frame waiting time corresponding to the intra frame of the first group of coded picture frames.

10. The method according to claim 9, wherein the preset condition includes at least one of:
the intra frame of the first group of coded picture frames is a first intra frame uplink transmission of the video stream;
uplink transmission times of intra frames in a plurality of consecutive third groups of coded picture frames in the video stream are greater than a time threshold, the plurality of third groups of coded picture frames being before the first group of coded picture frames; or
the storage time is greater than a sum of the time threshold and a frame cycle of the video stream.

11. A video stream processing apparatus, comprising:
processing circuitry configured to:
receive a first group of coded picture frames in a video stream;
determine a storage time and a network request protection time corresponding to the first group of coded picture frames, the storage time being an amount of time an intra frame of the first group of coded picture frames is stored for transmission to a network node;
when the storage time is greater than a preset time threshold and a preset condition is met, indicating a transmission conflict with at least one second terminal occurs in a process of transmitting the intra frame to the network node, determine a start time of at least a second group of coded picture frames in the video stream according to the storage time and the network request protection time, the second group of coded picture frames being after the first group of coded picture frames; and
transmit an intra frame of the second group of coded picture frames to the network node based on the start time of the second group of coded picture frames.

12. The video stream processing apparatus according to claim 11, wherein the processing circuitry is configured to:
determine the network request protection time based on an obtained network scheduling request time and a preset protection time.

13. The video stream processing apparatus according to claim 11, wherein the processing circuitry is configured to:
determine the start time of the second group of coded picture frames according to a start time of the storage of the intra frame of the first group of coded picture frames for transmission, an intra frame transmit adjustment time, and a preset group of coded picture frames cycle.

14. The video stream processing apparatus according to claim 13, wherein the processing circuitry is configured to:
determine the intra frame transmit adjustment time according to a frame cycle of the video stream, the storage time, and the network request protection time, wherein
the intra frame transmit adjustment time is an integer multiple of the frame cycle.

15. The video stream processing apparatus according to claim 14, wherein the processing circuitry is configured to:
calculate a difference between the storage time and the network request protection time, to obtain a first value;
obtain a second value based on m times the frame cycle of the video stream and the first value; and when the second value is a minimum non-negative integer, determine m times of the frame cycle of the video stream as the intra frame transmit adjustment time, wherein m is a positive integer.

16. The video stream processing apparatus according to claim 11, wherein the processing circuitry is configured to:
when the intra frame of the second group of coded picture frames is obtained after the start time of the second group of coded picture frames, store the intra frame of the second group of coded picture frames by the video stream processing apparatus, and transmit the intra frame of the second group of coded picture frames to the network node.

17. The video stream processing apparatus according to claim 11, wherein the processing circuitry is configured to:
reset the video stream or adjust a length of the first group of coded picture frames;
obtain the intra frame of the second group of coded picture frames at the start time corresponding to the second group of coded picture frames; and
store the obtained intra frame of the second group of coded picture frames by the first terminal video stream processing apparatus.

18. The video stream processing apparatus according to claim 11, wherein
the processing circuitry is configured to, when the storage time is greater than the preset time threshold and the preset condition is met, determine that the conflict with the at least one second terminal occurs in the process of transmitting the intra frame of the first group of coded picture frames to the network node.

19. The video stream processing apparatus according to claim 18, wherein
the preset time threshold is determined by at least one of a network scheduling request time or an uplink frame waiting time corresponding to the intra frame of the first group of coded picture frames; and
the preset condition includes at least one of:
the intra frame of the first group of coded picture frames is a first intra frame uplink transmission of the video stream;
uplink transmission times of intra frames in a plurality of consecutive third groups of coded picture frames in the video stream are greater than a time threshold, the plurality of third groups of coded picture frames being before the first group of coded picture frames; or
the storage time is greater than a sum of the time threshold and a frame cycle of the video stream.

20. A non-transitory computer-readable storage medium, storing instructions which when executed by a processor cause the processor to perform:
receiving a first group of coded picture frames in a video stream;
determining a storage time and a network request protection time corresponding to the first group of coded picture frames, the storage time being an amount of time an intra frame of the first group of coded picture frames is stored for transmission to a network node;
when the storage time is greater than a preset time threshold and a preset condition is met, indicating a transmission conflict with at least one second terminal occurs in a process of transmitting the intra frame to the network node, determining a start time of at least a second group of coded picture frames in the video stream according to the storage time and the network request protection time, the second group of coded picture frames being after the first group of coded picture frames; and
transmitting an intra frame of the second group of coded picture frames to the network node based on the start time of the second group of coded picture frames.

* * * * *

UNITED STATES PATENT AND TRADEMARK OFFICE
CERTIFICATE OF CORRECTION

| | | |
|---|---|---|
| PATENT NO. | : 12,225,249 B2 | Page 1 of 1 |
| APPLICATION NO. | : 18/140490 | |
| DATED | : February 11, 2025 | |
| INVENTOR(S) | : Junling Mao | |

It is certified that error appears in the above-identified patent and that said Letters Patent is hereby corrected as shown below:

On the Title Page

Item (71), the Applicant city reads as:
Guangdong (CN)

Should read as:
--Shenzhen (CN)--

Signed and Sealed this
Eighteenth Day of March, 2025

Coke Morgan Stewart
*Acting Director of the United States Patent and Trademark Office*